United States Patent
Devdhar et al.

(10) Patent No.: US 8,018,918 B2
(45) Date of Patent: Sep. 13, 2011

(54) METHODS AND APPARATUS FOR DUAL-TONE MULTI-FREQUENCY SIGNAL CONVERSION WITHIN A MEDIA OVER INTERNET PROTOCOL NETWORK

(75) Inventors: Rakendu Devdhar, Germantown, MD (US); Xiaomin Lu, Chantilly, VA (US); Simon Arthur Oakley, Gaithersburg, MD (US); Christopher Michael Sherwin, Rockville, MD (US)

(73) Assignee: Genband US LLC, Plano, TX (US)

( * ) Notice: Subject to any disclaimer, the term of this patent is extended or adjusted under 35 U.S.C. 154(b) by 1110 days.

(21) Appl. No.: 11/771,270

(22) Filed: Jun. 29, 2007

(65) Prior Publication Data
US 2009/0003315 A1  Jan. 1, 2009

(51) Int. Cl.
*H04L 12/66* (2006.01)
*H04L 12/28* (2006.01)

(52) U.S. Cl. ......................... 370/352; 370/389
(58) Field of Classification Search .......... None
See application file for complete search history.

(56) References Cited

U.S. PATENT DOCUMENTS

| | | | |
|---|---|---|---|
| 5,794,201 | A | 8/1998 | Nejime et al. |
| 6,259,691 | B1 | 7/2001 | Naudus |
| 6,560,331 | B1 | 5/2003 | Cooklev et al. |
| 7,039,044 | B1 | 5/2006 | Whitfield et al. |
| 7,082,143 | B1 | 7/2006 | LeBlanc et al. |
| 7,209,473 | B1 | 4/2007 | Mohaban et al. |
| 7,447,193 | B1 * | 11/2008 | Ehlinger ......................... 370/352 |
| 2001/0021186 | A1 * | 9/2001 | Ono et al. ....................... 370/352 |
| 2002/0176404 | A1 * | 11/2002 | Girard ............................ 370/352 |
| 2003/0112796 | A1 | 6/2003 | Kwan |
| 2004/0001482 | A1 | 1/2004 | Yeom |
| 2004/0246949 | A1 * | 12/2004 | Cannon .......................... 370/352 |
| 2005/0083912 | A1 * | 4/2005 | Afshar et al. .................. 370/352 |
| 2006/0008074 | A1 | 1/2006 | Itoh |
| 2006/0083220 | A1 | 4/2006 | Mekala et al. |
| 2007/0076710 | A1 | 4/2007 | Khan |
| 2007/0116043 | A1 | 5/2007 | MeLampy et al. |
| 2007/0206580 | A1 | 9/2007 | Silver et al. |
| 2007/0206735 | A1 | 9/2007 | Silver et al. |

(Continued)

FOREIGN PATENT DOCUMENTS

WO  WO 2009/086518 A2  7/2009

OTHER PUBLICATIONS

Final Official Action for U.S. Appl. No. 11/965,272 (Dec. 17, 2010).

(Continued)

*Primary Examiner* — Hong Cho
(74) *Attorney, Agent, or Firm* — Jenkins, Wilson, Taylor & Hunt, P.A.

(57) ABSTRACT

In one embodiment, a method includes receiving a first internet protocol (IP) packet having information associated with a dual-tone multi-frequency (DTMF) signal. The information of the first IP packet is configured based on a protocol associated with a first layer of a media over internet protocol (MoIP) network. The first IP packet is associated with a destination endpoint. The method also includes producing a second IP packet having information associated with the DTMF signal. The information of the second IP packet is configured based on a protocol associated with a second layer of the MoIP network and a DTMF conversion policy associated with the destination endpoint. The second layer is different than the first layer.

20 Claims, 7 Drawing Sheets

U.S. PATENT DOCUMENTS

2008/0137650 A1* 6/2008 Kumarasamy et al. ....... 370/356
2009/0168769 A1 7/2009 Lu et al.

OTHER PUBLICATIONS

Non-Final Official Action for U.S. Appl. No. 11/965,272 (Jun. 10, 2010).

Notification of Transmittal of the International Search Report and the Written Opinion of the International Searching Authority, or the Declaration for International Application No. PCT/US2008/088442 (Jun. 26, 2009).

Schulzrinne et al., "RTP Payload for DTMF Digits, Telphony Tones and Telephony Signals," RFC 2833, pp. 1-29 (May 2000).

Burger et al., "A Session Initiation Protocol (SIP) Event Package for Key Press Stimulus (KPML)," RFC 4730, pp. 1-56 (Nov. 2006).

Notification of Transmittal of the International Search Report and the Written Opinion of the International Searching Authority, or the Declaration for International Application No. PCT/US08/68710 (Jun. 11, 2009).

Notice of Allowance and Fee(s) Due for U.S. Appl. No. 11/965,272, filed (Jun. 10, 2011).

Communication of European publication number and information on the application of Article 67(3) EPC for European Application No. 08868490.7 (Sep. 8, 2010).

Communication of European publication number and information on the application of Article 67(3) EPC for European Application No. 08781147.7 (Mar. 10, 2010).

* cited by examiner

METHODS AND APPARATUS FOR DUAL-TONE MULTI-FREQUENCY SIGNAL CONVERSION WITHIN A MEDIA OVER INTERNET PROTOCOL NETWORK

BACKGROUND

Embodiments of the invention relate generally to dual-tone multi-frequency signals, and, in particular, to methods and apparatus for dual-tone multi-frequency (DTMF) signal processing and conversion of DTMF packets within a media over Internet Protocol (MoIP) network.

In MoIP networks, DTMF signals can be transmitted between endpoints communicating via Internet Protocol (IP) packets. Although DTMF signals are often transmitted in IP packets based on either signaling-based methods or media-based methods, each of these methods include a variety of protocols that have different conventions and standards. For example, at least three alternative protocol configurations that can be used to encode DTMF signals into an IP packet are available in session initiation protocol (SIP) alone. Typically network equipment and/of network software vendors support a small subset of the DTMF signaling methods, such as those identified above, in their products. This poses a significant interoperability challenge to not only network equipment/software providers, but also to service providers who integrate network equipment from various vendors to implement their services and applications. Thus, a need exists for methods and apparatus for processing DTMF signals and converting IP packets that have information associated with DTMF signals within a MoIP network.

SUMMARY OF THE INVENTION

In one embodiment, a method includes receiving a first internet protocol (IP) packet having information associated with a dual-tone multi-frequency (DTMF) signal. The information of the first IP packet is configured based on a protocol associated with a first layer of a media over internet protocol (MoIP) network. The first IP packet is associated with a destination endpoint. The method also includes producing a second IP packet having information associated with the DTMF signal. The information of the second IP packet is configured based on a protocol associated with a second layer of the MoIP network and a DTMF conversion policy associated with the destination endpoint. The second layer is different than the first layer.

DETAILED DESCRIPTION

A session exchange device within a media over Internet Protocol (MoIP) network can be configured to process or trigger a separate module to process Internet Protocol (IP) packets that have information associated with at least a portion of one or more dual-tone multi-frequency (DTMF) signals. The information can define and/or be used to define the DTMF signal (e.g., textual description, waveform) and can be, for example, encoded in a payload portion of an IP packet or described in a header portion of an IP packet. DTMF signals are standardized signals (e.g., touch-tone signals) defined by the International Telecommunications Union (ITU) for telephone dialing and other telephony-based applications such as conferencing, voicemail, interactive voice response (IVR) systems, and so forth. An IP packet that has information associated with (e.g., configured to communicate) at least a portion of a dual-tone multi-frequency (DTMF) signal or multiple DTMF signals can be referred to as a DTMF packet. The MoIP network can be, for example, a Voice over Internet Protocol (VoIP) network, a Video over Internet Protocol (VoIP) network, or a Session over Internet Protocol (SoIP) network.

A DTMF packet can have information associated with any layer (e.g., open systems interconnection (OSI) layer) of a MoIP network such as a signaling layer of the MoIP network or a media layer of the MoIP network. For example, the DTMF packet can be configured based on a signaling protocol such as a session initiation protocol (SIP) or a proprietary IP signaling protocol associated with a signaling layer of a MoIP network.

The session exchange device can be configured to determine whether or not a IP packet has information associated with at least a portion of a DTMF signal regardless of the layer with which the IP packet is associated. The session exchange device can also be configured to determine with which layer of a MoIP network the incoming DTMF packet is associated and to process the incoming DTMF packet accordingly. In some embodiments, the session exchange device can be configured to separate one or more incoming IP packets identified as DTMF packets from non-DTMF packets (e.g., incoming IP packets not including information associated with a DTMF signal) and to store the DTMF packets in a memory. In some embodiments, the DTMF packets are stored without storing the non-DTMF packets.

The session exchange device can be configured to modify a DTMF packet and/or produce a new DTMF packet based on the DTMF packet and a DTMF conversion policy associated with an endpoint (e.g., source endpoint, destination endpoint) associated with a MoIP network. For example, the session exchange device can be configured to modify an DTMF packet from one protocol (e.g., session initiation protocol (SIP)) to another protocol (e.g., G.711) and forward the modified DTMF packet to a destination endpoint. In some embodiments, the session exchange device can be configured to produce a DTMF packet or multiple DTMF packets based on one or more DTMF packets received at the session exchange device. The DTMF packets produced by the session exchange device can be associated with one or more layers and/or can be based on one or more protocols that are different than those associated with the DTMF packets received at the session exchange device.

Modifying a DTMF packet so that the DTMF packet is based on a different protocol, modifying a DTMF signal associated with a DTMF packet, and producing a new DTMF packet based on a different DTMF packet can collectively or individually be referred to as converting a DTMF packet or translating a DTMF packet. DTMF packets received at a session exchange device can be referred to as incoming or ingress DTMF packets, and DTMF packets sent from the session exchange device can be referred to as outgoing to egress DTMF packets. Likewise IP packets received at a session exchange device can be referred to as incoming or ingress IP packets, and IP packets sent from the session exchange device can be referred to as outgoing to egress IP packets.

A session exchange device can include a DTMF management engine configured to perform the functions associated processing of DTMF packets. In some embodiments, a session exchange device can be configured to trigger a separate device such as a different session exchange device to perform the DTMF processing functions associated with the session exchange device. In some embodiments, the session exchange device can function as a session border controller (SBC) or can be associated with a session border controller.

Figure 1:
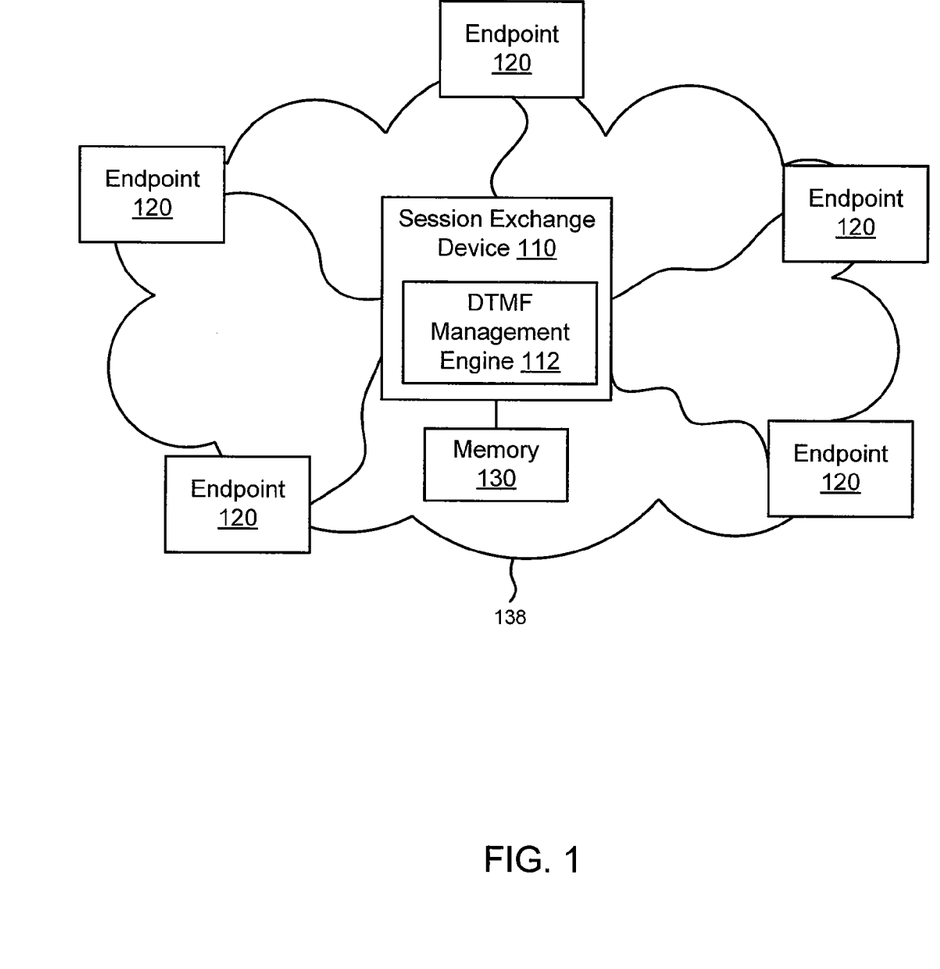
FIG. 1 is a schematic block diagram that illustrates a session exchange device having a dual-tone multi-frequency (DTMF) management engine configured to process incoming and/or outgoing DTMF packets transmitted between endpoints over a media over internet protocol (MoIP) network, according to an embodiment of the invention.

Referring now to the drawings, FIG. 1 is a schematic block diagram that illustrates a session exchange device 110 having a DTMF management engine 112 configured to process incoming and/or outgoing DTMF packets transmitted between endpoints 120 over MoIP network 138, according to an embodiment of the invention. Each of the endpoints 120 can function as a source endpoint and/or a destination endpoint, and can be an endpoint from the perspective of the session exchange device 110. The session exchange device 110 can operate as a multi-protocol session exchange device that can be configured to function as an interface device between different endpoints 120 (e.g., networks), for example, at the borders of a MoIP network 138 (e.g., session border controller). The session exchange device 110 is also in communication with a memory 130 that can be, for example, a database.

Each of the endpoints 120 can be, for example, a public switched telephone network (PSTN), a broadband network that can provide network access to broadband consumers, an enterprise network, an H.323 network, a session initiation protocol (SIP) softswitch network, a SIP network, an individual phone/computer terminal and/or an access point (e.g., another session exchange device) to another MoIP network (not shown). Although shown as a single MoIP network 138 in this embodiment, the MoIP network 138 can be a collection of one or more MoIP networks, can be associated with a separate MoIP network (not shown), and/or can have more than one wired and/or wireless segment.

The DTMF management engine 112 is a software-based (e.g., set of instructions executable at a processor, software code) and/or a hardware-based (e.g., processor, application-specific integrated circuit (ASIC), field programmable gate array (FPGA)) management engine configured to receive (e.g., intercept) at least a portion of an IP packet transmitted between any of the endpoints 120. The DTMF management engine 112 is configured to determine whether or not the IP packet has information associated with at least a portion of a DTMF signal or multiple DTMF signals. In other words, the DTMF management engine 112 can be configured to determine whether or not an IP packet has information associated with (e.g., is configured to communicate with) one or more DTMF signals to a first endpoint 120 and sent from a second endpoint 120 over the MoIP network 138.

The DTMF management engine 112 can be configured to parse out one or more portions of an IP packet received at the session exchange device 110 and analyze the parsed portion(s) to determine whether or not the IP packet is associated with (e.g., configured to communicate) a DTMF signal. For example, the session exchange device 110 can receive an IP packet and analyze the payload of the IP packet and/or header information associated with the IP packet to determine whether or not the IP packet has information associated with a DTMF signal.

Figure 2:
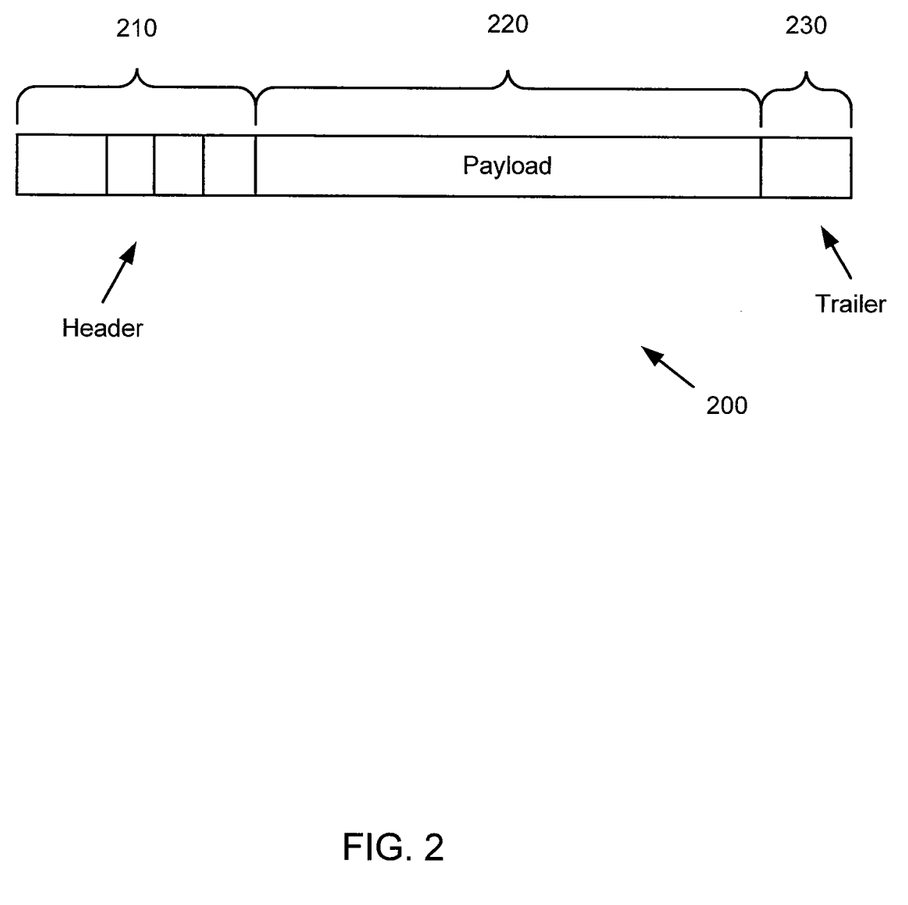
FIG. 2 illustrates an internet protocol (IP) packet that can be configured to include information associated with a DTMF signal and that can be analyzed by a DTMF management engine, according to an embodiment of the invention.

For example, FIG. 2 illustrates an IP packet 200 that can be configured to include information associated with a DTMF signal and that can be analyzed by a DTMF management engine, according to an embodiment of the invention. Specifically, the IP packet 200 has a header 210, a payload 220 and a trailer 230, and can be an outgoing IP packet or an incoming IP packet. Information associated with a DTMF signal can be included in any portion of the IP packet 200 such as at least a portion of the header 210 and/or at least a portion of the payload 220. The information can be, for example, DTMF parameters (or parameter values) that can be used to define the DTMF signal such as a duration of the DTMF signal, a frequency of the DTMF signal, a start/stop time of the DTMF signal (e.g., start/stop timestamp, DTMF stop event, DTMF start event), and so forth. This type of information can be included in the header 210 and/or the payload 220 of the IP packet 200.

In some embodiments, a DTMF signal can be encoded as information such as a waveform in, for example, the payload 220 of the packet. For example, the waveform in the payload 220 can be a digitized version of a tone for a specified duration (e.g., 5 seconds, 0.4 seconds). The tone can be, for example, a tone associated with the number 1 (e.g., combination of 697 Hz and 1209 Hz frequency tones) or a tone associated with the number 5 (e.g., combination of 770 Hz and 1336 Hz frequency tones). In some embodiments, the waveform can be any type of digitized waveform (e.g., mp3, wav) in an uncompressed or compressed format. The duration of the DTMF tone/signal can be, in some embodiments, defined by the length of the waveform within the payload 220.

In some embodiments, a DTMF signal can be described in both the header 210 and payload 220 of the IP packet 200. For example, a first portion of the DTMF signal can be defined in the header 210 and a second portion of the DTMF signal can be defined in the payload 220. In some embodiments, for example, some DTMF parameters associated with the DTMF signal such as the duration of the DTMF signal can be described (e.g., included) in the header 210 of the IP packet 200 and the frequency of the DTMF signal can be included in the payload 220 of the IP packet 200 as a digitized waveform.

Although several examples of the type of information associated with a DTMF signal (e.g., DTMF parameters, digitized waveform) were described above, information associated with a DTMF signal can be defined and/or included in an IP packet 200 in various other ways to describe any aspect/characteristic of a DTMF signal such that the DTMF signal can be processed by a session exchange device (e.g., session exchange device 110 shown in FIG. 1). For example, DTMF parameters different than those described above can be defined and included in an IP packet 200 as information associated with a DTMF signal. In some embodiments, information associated with a DTMF signal can be included in a different portion of an IP packet (e.g., a portion of the trailer 230) that can be based on a different protocol (e.g., different format, different synchronization, different syntax, different data transfer rules) than the IP packet 200 shown in FIG. 2.

Referring back to FIG. 1, the DTMF management engine 112 can be configured to analyze an IP packet (e.g., portion of a header, portion of a payload) associated with any networking layer (e.g., open systems interconnection (OSI) layer) of the MoIP network 138 to determine whether or not the IP packet is a DTMF packet. The DTMF management engine 112 can analyze, for example, an IP signaling packet to determine whether or not the IP signaling packet has information associated with a DTMF signal (can be referred to as a DTMF signaling packet). An IP signaling packet is an IP packet configured based on a protocol (e.g., format, computing standard, communication rules) associated with a signaling layer of the MoIP network 138 or otherwise associated with the signaling layer of the MoIP network 138. The DTMF signaling packet (an IP signaling packet that has information associated with at least a portion of a DTMF signal) or any portion of the DTMF signaling packet can be configured based on, for example, a proprietary IP signaling protocol and/or any of the signaling-based protocols such as the signaling-based protocols shown in FIG. 4 (e.g., Q.931).

Also, the DTMF management engine 112 can analyze an IP packet that has been configured based on a protocol associated with, for example, a media layer of the MoIP network 138 (referred to as an IP media packet) this allows the DTMF management engine 112 to determine whether or not the IP media packet has information associated with at least a portion of a DTMF signal (can be referred to as a DTMF media packet). The DTMF media packet or any portion of the DTMF media packet can be configured, for example, based on a media-based protocol such as a real-time transport protocol (RTP), any of the media-based protocols shown in FIG. 4 (e.g., G.711), and/or a proprietary IP media protocol. In some embodiments, a DTMF packet associated with a media layer can be referred to as a DTMF media-based packet or as an in-band DTMF packet and a DTMF packet associated with a signaling layer can be referred to as a DTMF signaling-based packet or as an out-of-band DTMF packet.

In some embodiments, the session exchange device 110 can be configured to separate one or more IP packets identified as DTMF packets from non-DTMF packets and store them in the memory 130. For example, the DTMF packets associated with a media signal stream can be separated (e.g., extracted) from the media signal stream and stored in the memory 130 separate from non-DTMF media packets. The DTMF packets can be associated with a session or portion of a session between an ingress endpoint 120 functioning as a source endpoint and an egress endpoint 120 functioning as a destination endpoint.

In some embodiments, an DTMF packet can be separated from a set of non-DTMF packets and an instance of the DTMF packet stored in the memory 130 before the DTMF packet is forwarded to an egress endpoint 120 functioning as a destination endpoint. The DTMF packets can be analyzed and/or stored in real-time (e.g., as the DTMF packets are received) and sent to, for example, a law enforcement agency in real-time. The DTMF packets can be sent to a law enforcement agency, for example, to comply with provisions within Communications Assistance for Law Enforcement Act (CALEA). In some embodiments, the DTMF packets are separated, stored and/or forwarded to a law enforcement agency without storing and/or forwarding the non-DTMF packets to the law enforcement agency.

The DTMF management engine 112 of the session exchange device 110 can be configured to modify at least a portion of a DTMF packet received from an ingress endpoint 120 or to produce a different/new DTMF packet based on the DTMF packet received from the ingress endpoint 120. For example, the DTMF packet can be changed from a DTMF packet that has been configured based on a first protocol to a DTMF packet that has been configured based on a second protocol. In some embodiments, the first protocol and the second protocol can be associated with different layers of the MoIP network 138.

If a given endpoint 120 is configured to process only IP packets based on a specified signaling protocol (DTMF signaling packets), the DTMF management engine 112 can modify an incoming IP packet that is based on a media protocol and addressed to the endpoint 120 into an outgoing IP packet that is based on the specified signaling protocol associated with that endpoint 120. The DTMF management engine 112 can modify the incoming IP packet into an IP packet based on a different protocol by modifying one or more portions of the incoming IP packet (e.g., header portion). The session exchange device 110 can then forward the modified IP packet based on the signaling protocol to the endpoint 120.

In some embodiments, the DTMF management engine 112 can be configured such that a DTMF signal associated with the IP packet is substantially the same as that in a modified IP packet even though the protocol of the modified IP packet associated with the DTMF signal is, for example, configured based on a different protocol. In some embodiments, the session exchange device 110 can be configured to modify or trigger a separate device (not shown) to modify a DTMF packet.

In some embodiments, rather than modifying a portion of an incoming DTMF packet so that the incoming DTMF packet is changed from one protocol to another protocol and forwarded as an outgoing DTMF packet, the DTMF management engine 112 can be configured to produce a new DTMF packet based on an incoming DTMF packet. The DTMF management engine 112 can be configured so that a DTMF signal defined by the incoming DTMF packet is substantially the same as the DTMF signal defined by the new DTMF packet.

The DTMF management engine 112 can be configured to produce the new DTMF packet based on a different protocol or the same protocol as the incoming DTMF packet. The protocols can be, for example, associated with different layers of the MoIP network 138. When the incoming DTMF packet is addressed to a particular endpoint 120 functioning as a destination endpoint, the session exchange device 110 can be configured to forward the new DTMF packet to the destination endpoint 120 rather than forward the incoming DTMF packet to the destination endpoint 120. In some embodiments, an instance of the incoming DTMF packet and/or an instance of the new DTMF packet can be stored in the memory 130 or a memory (not shown) local to the session exchange device 110, for example, for CALEA purposes.

For example, the DTMF management engine 112 of the session exchange device 110 can receive a first IP packet associated with a DTMF signal and based on a first protocol associated with a first layer from a first endpoint 120. The DTMF management engine 112 can produce a second IP packet associated with the DTMF signal and based on a second protocol associated with a second layer of the MoIP network 138. If the first IP packet was addressed to a second endpoint 120, the DTMF management engine 112 and/or session exchange device 110 can forward the second IP packet to the second endpoint 120 rather than the first IP packet.

In some embodiments, a new/outgoing DTMF packet can be produced based on a library of DTMF/IP packet portions that can be pre-configured and stored in the memory 130 (or a separate memory (not shown)). For example, a payload of a new/outgoing DTMF media packet can be produced based on a waveform stored in the memory 130 that corresponds with a DTMF signal. Multiple instances of the waveform can be included in the payload so that a specified duration of the DTMF signal can be produced. In some embodiments, at least a portion of the header information associated with an incoming DTMF packet such as destination address, source address, etc. can be replicated in a new DTMF packet and/or an outgoing DTMF packet.

The DTMF management engine 112, in some embodiments, can be configured to modify a DTMF signal defined within an IP packet. In some embodiments, the modifying of the DTMF signal can be in addition to changes in a protocol of the IP packet that has information associated with the DTMF signal. In some embodiments, the DTMF management engine 112 can be configured to translate a DTMF signal associated with a particular tone into a DTMF signal associated with a different tone.

The DTMF management engine 112 can be configured to convert a DTMF packet based on a DTMF conversion policy that can be, for example, stored in the memory 130 or a memory of the session exchange device 110. The rules defined within a DTMF conversion policy can be associated with any combination of the endpoints 120 (e.g., source endpoint, destination endpoint) of the MoIP network 138. For example, the DTMF management engine 112 can be configured to modify an incoming DTMF packet from an ingress endpoint 120 functioning as a source endpoint based on a DTMF conversion policy associated with the egress endpoint 120 functioning as a destination endpoint such that the egress endpoint 120 can successfully process the DTMF packet.

In some embodiments, the DTMF management engine 112 can be configured to implement a DTMF conversion policy associated with a single endpoint 120 or a set of endpoints 120. For example, if the DTMF management engine 112 determines that an IP packet has information associated with a DTMF signal, the DTMF management engine can identify (e.g., determine) the particular destination endpoint 120 of the IP packet. The DTMF management engine 112 can then retrieve a DTMF conversion policy associated with that destination endpoint 120 and modify the IP packet, if necessary, based on the DTMF conversion policy.

In some embodiments, the DTMF conversion policy can be stored in, for example, the memory 130 and can be accessed from the memory 130 by the session exchange device 110 when needed. The memory 130 can be associated with, for example, a database or set of databases. In some embodiments the DTMF conversion policy can be stored in a memory (not shown) local to the session exchange device 110 such as a random access memory (RAM), removable storage device, and/or hard disk drive.

Figure 3:
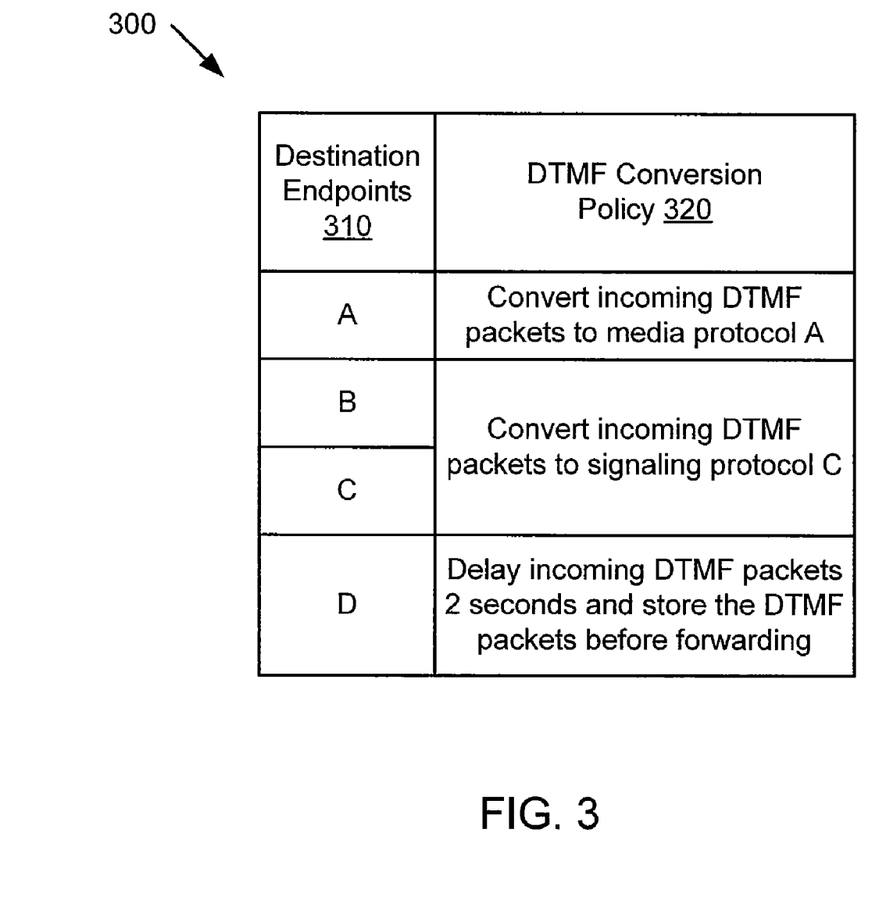
FIG. 3 is a schematic diagram of a database that illustrates DTMF conversion policies associated with one or more destination endpoints, according to an embodiment of the invention.

FIG. 3 is a schematic diagram of a database 300 that illustrates DTMF conversion policies 320 associated with one or more destination endpoints 310, according to an embodiment of the invention. The DTMF conversion policies 320 are policies defined be used by, for example, a management engine such as that shown in FIG. 1, to perform one or more functions or tasks defined within the DTMF conversion policies 320 when a DTMF packet is addressed to at least one of the destination endpoints 310. For example, in response to receiving an incoming DTMF packet (after detecting that the IP packet has information associated with a DTMF signal), a DTMF management engine can receive (e.g., retrieve) a DTMF conversion policy 320 based on, for example, an identity of a destination endpoint (e.g., IP address) included in the DTMF packet. Subsequently, the DTMF management engine can implement the DTMF conversion policy 320.

The database 300 illustrates, for example, that destination endpoint A in column 310 is associated with a DTMF conversion policy 320 defined, for example, to trigger a DTMF management engine to convert incoming DTMF packets to media protocol A. Destination endpoint B and C are associated with a DTMF conversion policy 320 defined, for example, to trigger a DTMF management engine to convert incoming DTMF packets to signaling protocol C. Destination endpoint D is associated with a DTMF conversion policy 320 defined, for example, to trigger a DTMF management engine to delay incoming DTMF packets by 2 seconds and store the DTMF packets before forwarding. In some embodiments, a DTMF management can be configured to forward the converted DTMF packet (e.g., modified DTMF packet, new DTMF packet produced based on an incoming DTMF packet) to the appropriate destination endpoint 310.

In some embodiments, a DTMF conversion policy can include a variety of conditions (e.g., threshold conditions) and/or instructions, in addition to, or different than those shown in FIG. 3. For example, a DTMF conversion can include conditions that are satisfied and/or instructions that are triggered based on a variety of parameters such as an identity of a source endpoint indicated within a DTMF packet, a time of day, a protocol associated with an incoming DTMF packet, and so forth. The conditions and/or instructions can be configured to trigger a DTMF management engine to perform specific functions related to incoming DTMF packets and/or outgoing DTMF packets. For example, in some embodiments, a DTMF conversion policy associated with a destination endpoint can be defined so that all DTMF signals sent to a particular destination endpoint will have a truncated duration and will be defined within an IP packet based on a specified protocol.

In some embodiments, a specified set of DTMF conversion policies can be implemented by a DTMF management engine based on a condition such as a time of day or a day of the week. In some embodiments, a specified set of DTMF conversion policies can be implemented based on a parameter associated with a session exchange device such as a version of hardware and/or software associated with the session exchange device or an identity of a session exchange device.

Figure 4:
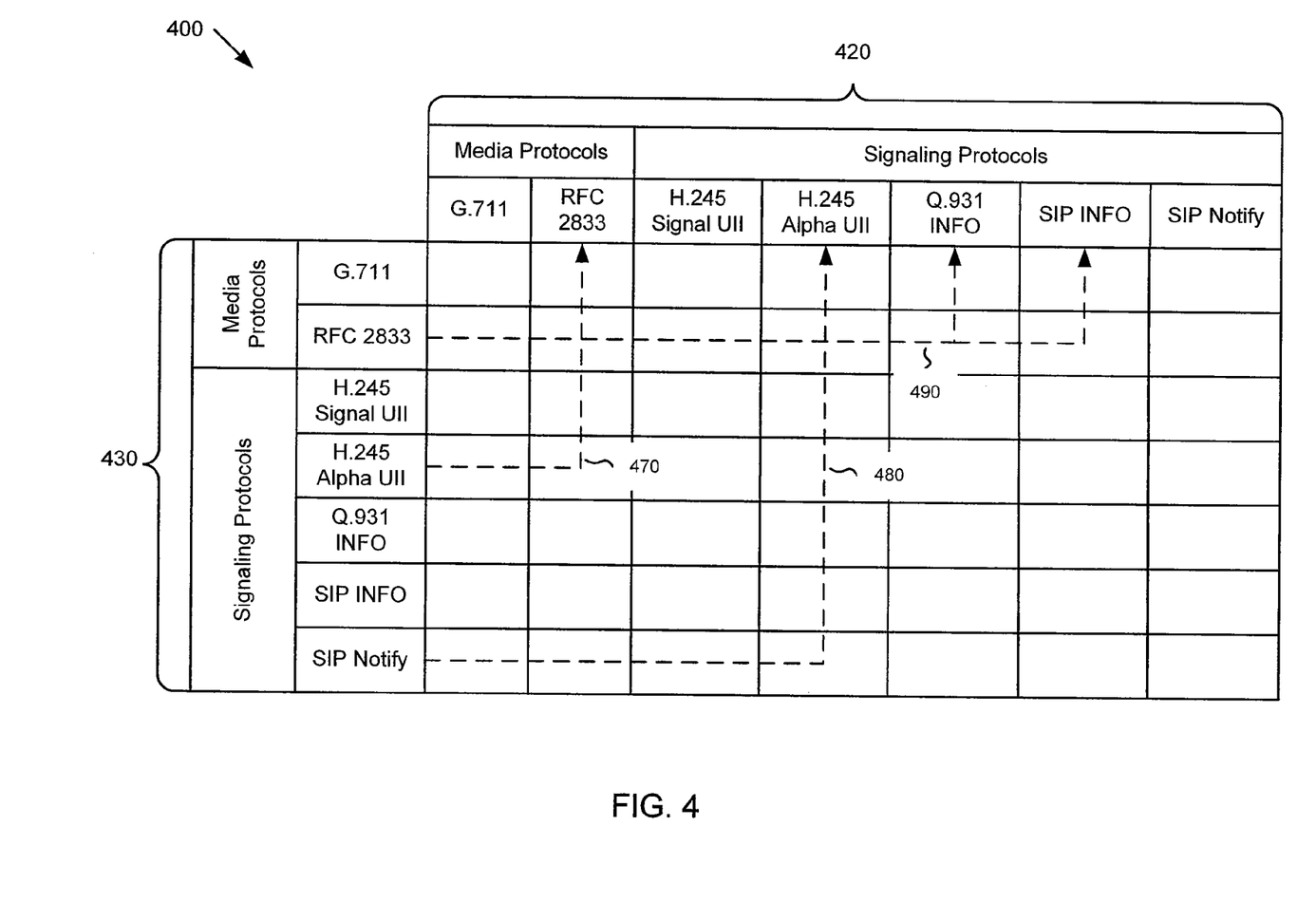
FIG. 4 is a schematic diagram of a grid that illustrates example DTMF packet conversions that can be performed by a DTMF management engine and/or defined within a DTMF conversion policy, according to an embodiment of the invention.

FIG. 4 is a schematic diagram of a grid 400 that illustrates example DTMF packet conversions that can be performed by a DTMF management engine and/or defined within a DTMF conversion policy, according to an embodiment of the invention. The DTMF management engine can be a DTMF management engine such as that shown in FIG. 1. The grid 400 includes several media protocols and/or signaling protocols that can be associated with a destination endpoint (egress endpoint) across an egress side 420 of the grid 400 (top portion) and several media protocols and/or signaling protocols that can be associated with a source endpoint (ingress endpoint) shown on an ingress side 430 of the grid 400 (side portion). In other words, a destination endpoint and/or source endpoint can be configured to process one or more DTMF packets configured based on any combination of these media protocols and signaling protocols illustrated in the grid 400.

The media protocols and signaling protocols that can be associated with the destination endpoint can be referred to as egress protocols, and the media protocols and signaling protocols that can be associated with the source endpoint can be referred to as ingress protocols. For example, H.245 Signal UII on the egress side 420 is a signaling egress protocol that can be associated with a destination endpoint.

The grid 400 illustrates several examples of DTMF packet conversions can be performed at a DTMF management engine between, for example, media protocols, a media protocol(s) and a signaling protocol(s), signaling protocols, and so forth. For example, the grid 400 is illustrated with a dashed line 470 from the H.245 Alpha UII signaling protocol on the ingress side 430 to the RFC 2833 media-signaling protocol on the egress side 420. The dashed line 470 is shown in the grid 400 to represent that an incoming DTMF packet from a source endpoint and based on the H.245 Alpha UII signaling protocol can be converted at, for example, a DTMF management engine of a session exchange device into an outgoing/egress DTMF packet based on the RFC 2833 media-signaling protocol. The conversion can be based on a DTMF conversion policy associated with this egress/destination endpoint combination. In some embodiments, and following this example, a new DTMF packet (e.g., outgoing DTMF packet) that is configured based on the RFC 2833 media-signaling protocol can be sent to the destination endpoint.

As another example, a dashed line 480 from the SIP Notify signaling protocol on the ingress side 430 to the H.245 Alpha UII signaling protocol on the egress side 430 is shown in the grid 400 to represent that an incoming DTMF packet from a source endpoints and based on the SIP Notify signaling protocol, can be converted into an outgoing/egress DTMF packet based on the H.245 Alpha UII signaling protocol.

In some embodiments, a DTMF signal associated with a single incoming DTMF packet can be divided and included in multiple DTMF packets that can each be configured based on the same protocol or different protocols. The dashed line 490 in FIG. 4 illustrates such a scenario. An incoming DTMF packet configured based on the RFC 2833 media protocol can be divided and defined in, for example, two DTMF packets—one DTMF packet configured based on the Q.931 INFO signaling protocol and another DTMF packet configured based on the SIP INFO signaling protocol—as shown by the dashed line 490. In some embodiments, a single DTMF packet that has been configured based on a signaling protocol including information related to a DTMF signal such as, for example, a specified frequency of the DTMF signal and a duration of the DTMF signal can be encoded into waveforms that are included in the payloads of multiple IP packets that are each configured based on one or more media protocols.

In some embodiments, a DTMF signal associated with multiple DTMF packets (e.g., encoded in multiple DTMF packets) can be consolidated into a single DTMF packet. For example, a DTMF signal encoded into waveforms that are included in the payloads of multiple ingress IP packets that each has been configured based on one or more media protocols can be received and converted into a single DTMF packet configured based on, for example, a signaling protocol or a media protocol. In some embodiments, a first set of DTMF packets can be converted into a second set of DTMF packets such that the first set has a different number of DTMF packets than the second set of DTMF packets. The first set of DTMF packets can be associated with one or more layers and/or can be based on one or more protocols that are different than those associated with second set of DTMF packets.

Figure 5:
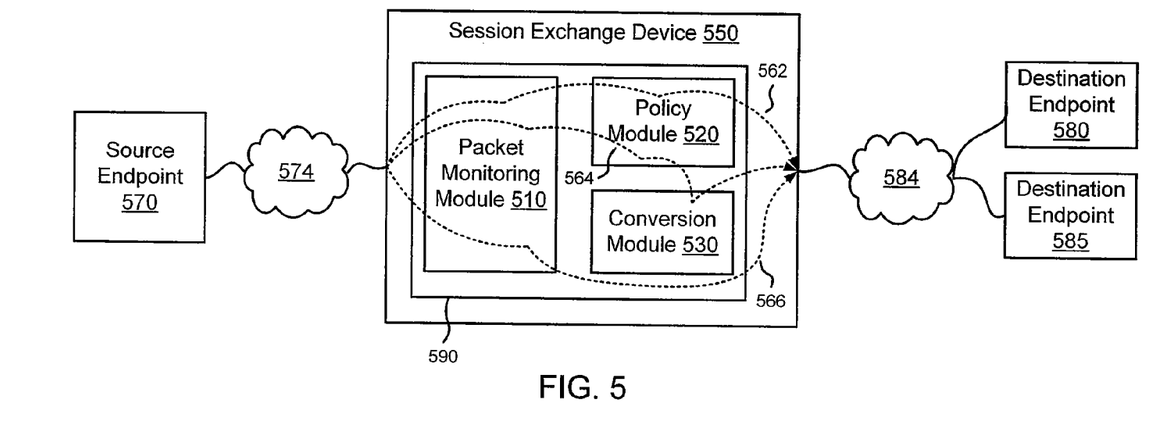
FIG. 5 is a schematic diagram that illustrates a DTMF management engine associated with a session exchange device, according to an embodiment of the invention.

FIG. 5 is a schematic diagram that illustrates a DTMF management engine 590 associated with a session exchange device 550, according to an embodiment of the invention. The DTMF management engine 590 can be a software and/or hardware engine that includes a packet-monitoring module 510, a policy module 520, and a conversion module 530. In this embodiment, the DTMF management engine 590 is configured to receive IP packets that are addressed to either destination endpoint 580 or destination endpoint 585 and sent from a source endpoint 570. After processing the IP packets, the session exchange device 550 is configured to send the IP packets to the destination endpoint 580. The IP packets are sent to and from the session exchange device 550 via networks 574 and 584, respectively.

The packet-monitoring module 510 of the DTMF management engine 590 is configured to determine whether or not incoming IP packets have information associated with a DTMF signal. In other words, the packet-monitoring module 510 is configured to determine whether or not an incoming IP packet is a DTMF packet. If the IP packet is not a DTMF packet as determined by the packet-monitoring module 510, the IP packet is not processed any further by the DTMF management engine 590 as illustrated by line 566.

If the packet-monitoring module 510 determines that an incoming IP packet is a DTMF packet, in this embodiment, the policy module 520 is configured to determine whether or not a DTMF conversion policy should be applied to the DTMF packet based on a destination address included in the DTMF packet. If the IP packet is a DTMF packet, but the policy module 520 determines that the DTMF packet should not to be converted according to a DTMF conversion policy, the IP packet is processed by the DTMF management engine 590 as illustrated by line 562. For example, the policy module 520 can determine that a DTMF packet addressed to destination endpoint 580 should not be converted based on a DTMF conversion policy if destination endpoint 580 is not associated with a DTMF conversion policy. This may be the case, for example, if the destination endpoint 530 can process the DTMF packet in the form it is received at session exchange device 530. The policy module 520 can access a database that includes DTMF conversion policies associated with identities of destination endpoints to make this determination.

If a DTMF conversion policy should be applied, the conversion module 530 is configured to implement the DTMF conversion policy by, for example, producing an outgoing DTMF packet configured based on a specific protocol and based on an incoming DTMF packet. After the outgoing packet has been produced, the outgoing packet can be further processed by the session exchange device 550, if necessary, or sent to the appropriate destination endpoint such as destination endpoint 580. The IP packet is processed by the DTMF management engine 590 as illustrated by line 564 if the IP packet is a DTMF packet that is converted based on a DTMF conversion policy. In some embodiments, the functions associated with the DTMF management engine 590 can be performed at more than one device (not shown).

Figure 6:
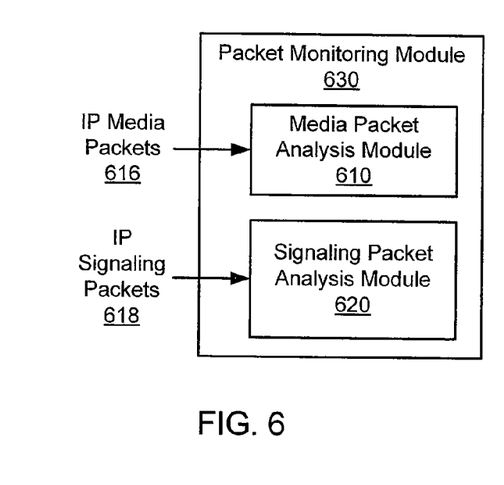
FIG. 6 is a schematic diagram that illustrates a packet monitoring module, according to an embodiment of the invention.

FIG. 6 is a schematic diagram that illustrates a packet-monitoring module 630, according to an embodiment of the invention. The packet-monitoring module 630 includes a media-packet-analysis module 610 and a signaling-packet-analysis module 620. In this embodiment, the media-packet-analysis module 610 receives IP media packets 616 and analyzes the payloads of each of the IP media packets 616 to determine whether or not any of the IP media packets 616 have information associated with a DTMF signal. The signaling-packet-analysis module 630 receives IP signaling packets 618 and analyzes the headers of each of the IP signaling packets 618 to determine whether or not any of the IP media packets 618 have information associated with a DTMF signal.

In some embodiments, the media-packet-analysis module 610 can be a software-based digital-signal-processor (DSP) emulator configured to handle the computational intensive task of analyzing each of the payloads of all or substantially all IP media packets 616 to individually determine whether or not an IP media packet from the IP media packets 616 has information associated with a DTMF signal in substantially real-time (e.g., as they are received). In other words, the latency for analysis by the media-packet-analysis module 610 can be within a desirable range when the media-packet-analysis module 610 is implemented as a software-based DSP emulator. The latency of analysis by a software-based module without DSP emulation technology can be different than that for a software-based DSP emulator. In some embodiments, the media-packet-analysis module 610 can be implemented as a software-based module without DSP emulation technology.

In some embodiments, the signaling-packet-analysis module 620 can be implemented a software-based module and/or a software-based DSP emulator. Because both the media-packet-analysis module 610 and the signaling-packet-analysis module 620 can be implemented as software-based modules, the functions associated with the packet-monitoring module 630 can be readily scaled within a session exchange device (not shown) or network of session exchange devices (not shown) that might otherwise be limited by hardware capacity limits. The media-packet-analysis module 610 and/or signaling-packet-analysis module 620, if software-based, can be executed on a processor or system of processor that can include, for example, one or more field programmable gate arrays (FPGAs) or one or more general purpose processors.

In some embodiments, the media-packet-analysis module 610 and/or the signaling-packet-analysis module 620 can be implemented, for example, on a media card associated with a session exchange device 630. In some embodiments, the media-packet-analysis module 610 and/or the signaling-packet-analysis module 620 can be implemented in any combination of hardware and software. In some embodiments, the packet-monitoring module 630 can be configured to filter all IP packets using for example, a preliminary filter module (not shown) to create the IP media packet stream 616 and the IP signaling packet stream 618.

Figure 7:
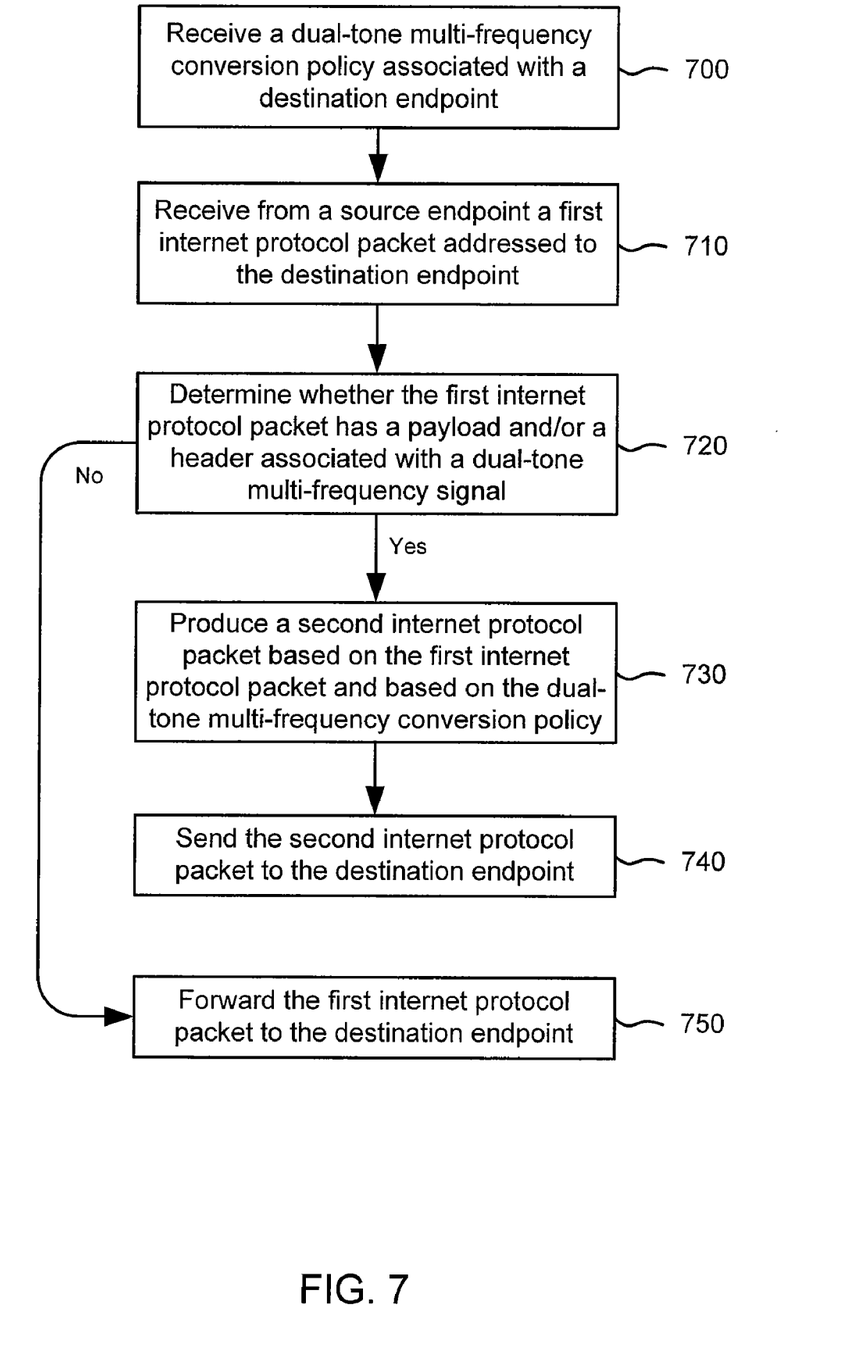
FIG. 7 is a flowchart that illustrates a method for processing IP packets, according to an embodiment of the invention.

FIG. 7 is a flowchart that illustrates a method for processing IP packets, according to an embodiment of the invention. The flowchart illustrates that a DTMF conversion policy associated with a destination endpoint is received at 700. The DTMF conversion policy can include one or more conditions and/or instructions associated with converting a DTMF packet. In some embodiments, the DTMF conversion policy can be associated with an endpoint or a set of endpoints such as a set of destination endpoints.

A first IP packet addressed to the destination endpoint is received from the source endpoint at 710. The first IP packet can be received at, for example, a DTMF management engine of a session exchange device.

A payload or a header of the first IP packet is analyzed to determine whether the payload and/or the header are associated with a DTMF signal at 720. In some embodiments, the payload can be analyzed using a software-based DSP emulator and the header can be analyzed using a software-based module.

If it is determined at 720 that the first IP packet does not have information associated with a DTMF packet, a first IP packet is forwarded to the destination endpoint at 750. If it is determined at 720 that the first IP packet has information associated with a DTMF packet, a second IP packet is produced based on the first IP packet and based on the DTMF conversion policy at 730.

Although not shown, in some embodiments, a third IP packet can be produced based on the first IP packet and based on the DTMF conversion policy. The second IP packet can have information associated with a first portion of the DTMF signal and the third IP packet can have information associated with a second portion of the DTMF signal.

Figure 8:
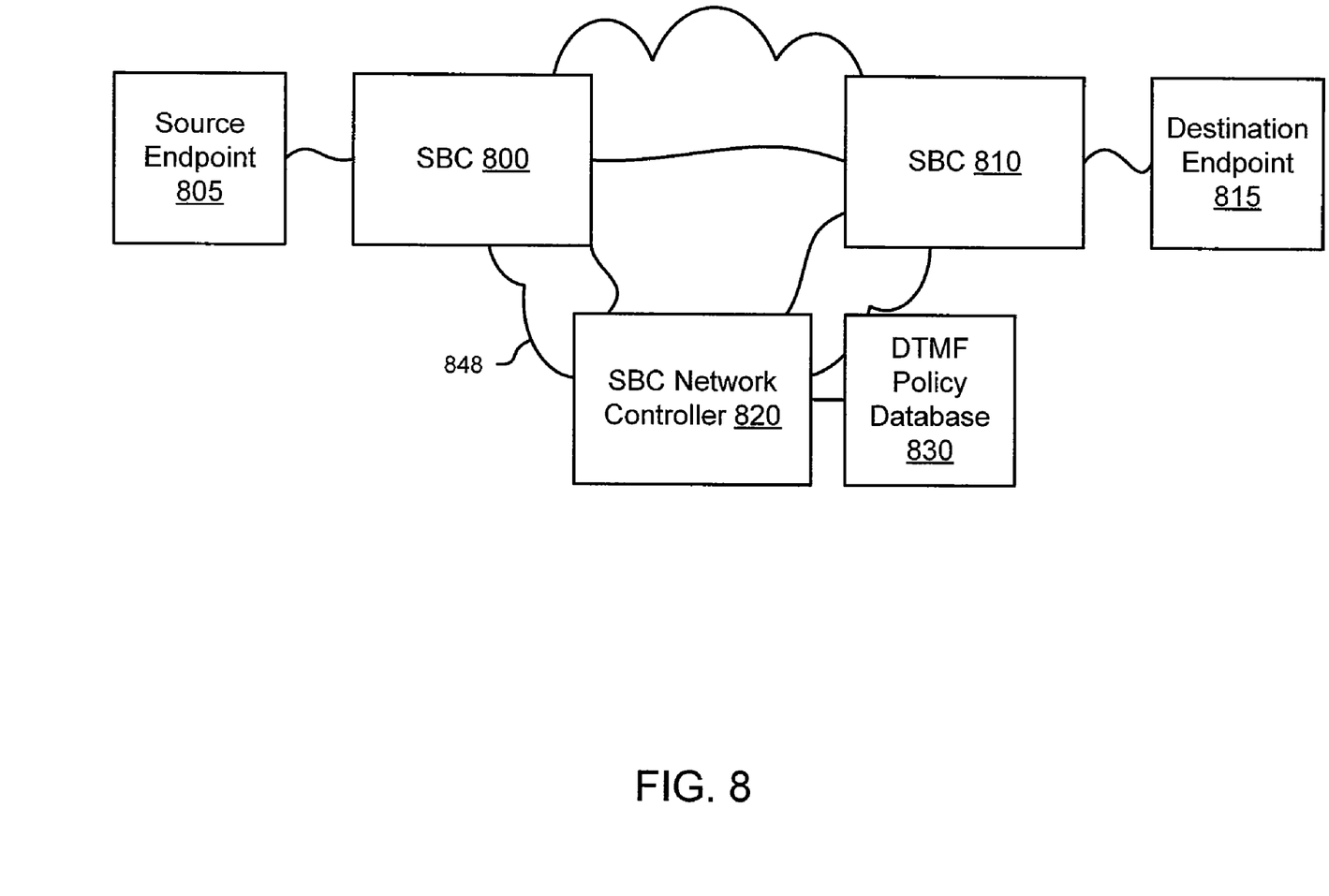
FIG. 8 is a schematic diagram that illustrates session border controllers (SBCs) configured to implement a DTMF conversion policy stored in a DTMF policy database, according to an embodiment of the invention.

FIG. 8 is a schematic diagram that illustrates SBCs configured to implement a DTMF conversion policy stored in a DTMF policy database 830, according to an embodiment of the invention. As shown in FIG. 8, SBC 800 is in communication with SBC 810 and SBC network controller 820 via MoIP network 848. SBC network controller 820 is configured to access one or more DTMF conversion policies stored in the DTMF policy database 830. SBCs 800 and 810 function as access points for the source endpoint 805 and destination endpoint 810, respectively, to the MoIP network 848.

In this embodiment, SBC 800 is configured to receive IP packets sent from the source endpoint 805 and addressed to the destination endpoint 815. SBC 800 analyzes the IP packets to determine whether or not any of the IP packets are DTMF packets. When the SBC 800 detects a DTMF packet, the SBC 800 is configured to trigger the SBC network controller 820 to access the DTMF policy database 830 to determine whether or not the DTMF packet should be converted based on a DTMF conversion policy. The SBC 800 can send the destination address and/or other information identifying the DTMF packet to the SBC network controller. The SBC network controller 820 can be configured to trigger SBC 810, rather than SBC 800, to convert the DTMF packet before the DTMF packet is sent to the destination endpoint 815. In some embodiments, SBC 800 and SBC 810 can be configured to transmit to each other DTMF packets and/or IP packets configured based on one or more protocols that are not compatible with (e.g., cannot be readily processed by) the source endpoint 805 and/or destination endpoint 815.

Some embodiments relate to a computer storage product with a computer-readable medium (also can be referred to as a processor-readable medium) having instructions or computer code thereon for performing various computer-implemented operations. The media and computer code (also can be referred to as code) may be those specially designed and constructed for the specific purpose or purposes. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

In conclusion, among other things, methods and apparatus for DTMF signal processing and conversion of DTMF packets within a MoIP network are described. While various embodiments have been described above, it should be understood that they have been presented by way of example only, and various changes in form and details may be made.

What is claimed is:

1. A method, comprising:
receiving a first internet protocol (IP) packet having information associated with a dual-tone multi-frequency (DTMF) signal, the information of the first IP packet being configured based on a protocol associated with a first layer of a media over internet protocol (MoIP) network, the first IP packet being associated with a destination endpoint; and
producing a second IP packet having information associated with the DTMF signal, the information of the second IP packet being configured based on a protocol associated with a second layer of the MoIP network and a DTMF conversion policy associated with the destination endpoint, the second layer being different than the first layer.

2. The method of claim 1, wherein the information of the second IP packet is associated with a first portion of the DTMF signal,
the method further comprising:
producing a third IP packet having information associated with a second portion of the DTMF signal, the information of the third IP packet being configured based on the protocol associated with the second layer of the MoIP network, the third IP packet being configured based on the first IP packet and based on the DTMF conversion policy associated with the destination endpoint, the second portion being different than the first portion.

3. The method of claim 1, further comprising sending the second IP packet to the destination endpoint.

4. The method of claim 1, wherein the first layer is a media layer, the second layer is a signaling layer.

5. The method of claim 1, wherein the first layer is a signaling layer, the second layer is a media layer.

6. The method of claim 1, further comprising:
selecting an IP packet portion from a plurality of IP packet portions stored in a memory based on the DTMF conversion policy and the DTMF signal, the producing includes producing the second IP packet based on the IP packet portion.

7. The method of claim 1, further comprising:
storing at least one of an instance of the first IP packet before the producing or an instance of the second IP packet in a memory after the producing; and
sending the second IP packet to the destination endpoint.

8. A method, comprising:
sending an indicator when a first internet protocol (IP) packet associated with a first layer of a media over internet protocol (MoIP) network has at least one of a payload or a header associated with at least a first portion of a dual-tone multi-frequency (DTMF) signal; and
producing a second IP packet associated with a second layer of the MoIP network in response to the indicator, the second IP packet having at least one of a payload or a header associated with at least a second portion of the DTMF signal, the second layer is different than the first layer.

9. The method of claim 8, wherein the first portion and the second portion are different.

10. The method of claim 8, wherein the determining is performed at a first session exchange device,
the method further comprising:
sending an instruction to a second session exchange device from the first session exchange device, the producing is performed at the second session exchange device based on an instruction.

11. The method of claim 8, wherein the first IP packet is associated with a destination endpoint, the producing includes producing the second IP packet based on a DTMF conversion policy associated with the destination endpoint.

12. The method of claim 8, wherein the first IP packet is associated with a destination endpoint,
the method further comprising:
selecting a protocol from a plurality of protocols associated with the second layer of the MoIP network based on a DTMF conversion policy associated with the destination endpoint, the producing includes producing based on the format.

13. The method of claim 8, wherein the first layer is a media layer and the second layer is a signaling layer.

14. The method of claim 8, wherein the determining includes determining using a software-based packet-monitoring module that includes a digital-signal-processing (DSP) emulator.

15. A method, comprising:
receiving a first internet protocol (IP) packet associated with a media layer of a media over internet protocol (MoIP) network and a second IP packet associated with a signaling layer of the MoIP network;
executing a software-based digital-signal-processing (DSP) emulator configured to analyze a payload of the first IP packet to determine whether at least a portion of the payload defines at least a portion of the first dual-tone multi-frequency (DTMF) signal; and
executing a software-based module configured to analyze a header of the second IP packet to determine whether at least a portion of the header defines a second DTMF signal.

16. The method of claim 15, further comprising:
producing a third IP packet having information associated with the portion of the first DTMF signal when the portion of the payload defines the portion of the first DTMF signal, the information of the third IP packet being configured based on a protocol associated with the signaling layer of the MoIP network.

17. The method of claim 15, further comprising:
producing a third IP packet having information associated with at least the portion of the second DTMF signal when the portion of the header defines the second DTMF signal, the information being configured based on a protocol associated with the media layer of the MoIP network.

18. The method of claim 15, further comprising:
receiving an indicator that the first IP packet is associated with the media layer, the executing the software-based DSP emulator being triggered in response to the indicator.

19. The method of claim 15, further comprising:
producing a third IP packet based on a DTMF conversion policy associated with a destination endpoint when at least one of the portion of the header defines the second DTMF signal or the portion of the payload defines the portion of the first DTMF signal.

20. The method of claim 15, wherein the first IP packet is associated with a destination endpoint,
the method further comprising:
storing an instance of the first IP packet in a memory when the portion of the payload defines the portion of the first DTMF signal; and
sending at least one of the first IP packet or a third IP packet to the destination endpoint, the third IP packet having information associated with the portion of the first DTMF signal when the portion of the payload defines the portion of the first DTMF signal, the information being configured based on a protocol associated with the signaling layer of the MoIP network.

* * * * *